United States Patent
Erck

[15] 3,672,109
[45] June 27, 1972

[54] PACKING AND SECURING STRIP FOR WINDSHIELDS

[72] Inventor: Karl Erck, Wolfsburg, Germany
[73] Assignee: Volkswagenwerk Aktiengesellschaft, Wolfsburg, Germany
[22] Filed: March 19, 1970
[21] Appl. No.: 21,063

[30] Foreign Application Priority Data

March 21, 1969 Germany...............P 19 14 350.1

[52] U.S. Cl..................................52/400, 52/173, 52/397
[51] Int. Cl..........................................E06b 3/54, E06b 3/56
[58] Field of Search.................52/400, 403, 398, 173, 417, 52/419, 420; 49/490

[56] References Cited

UNITED STATES PATENTS

| | | | |
|---|---|---|---|
| 3,307,306 | 3/1967 | Oliver | 52/173 |
| 3,338,015 | 8/1967 | Hoverman | 52/400 |
| 1,849,869 | 3/1932 | Fischer | 52/420 |
| 2,812,558 | 11/1957 | Lobanoff | 52/403 X |
| 2,698,072 | 12/1954 | Beck | 52/400 |
| 3,037,810 | 6/1962 | Kelley | 52/400 X |
| 2,813,748 | 11/1951 | Panik | 49/480 |

FOREIGN PATENTS OR APPLICATIONS 1,394,484   4/1965   France....................................52/400

*Primary Examiner*—Frank L. Abbott
*Assistant Examiner*—Henry E. Raduazo
*Attorney*—Watson, Cole, Grindle & Watson

[57] ABSTRACT

A packing and securing strip of flexible material for mounting glass windshield plates in a window opening of a metal frame with the aid of an adhesive with the strip mounted in the metal frame and a covering lip and a holding lip in contact with the frame.

During mounting of the plate and securing strip in the frame opening, the covering lip lies between the adhesive and the holding lip to prevent contact between the adhesive and the holding lip. After the plate and strip are pressed into the opening, the holding lip is drawn from between the covering lip and the body of the strip and over a flange of the opening, in a known manner.

3 Claims, 2 Drawing Figures

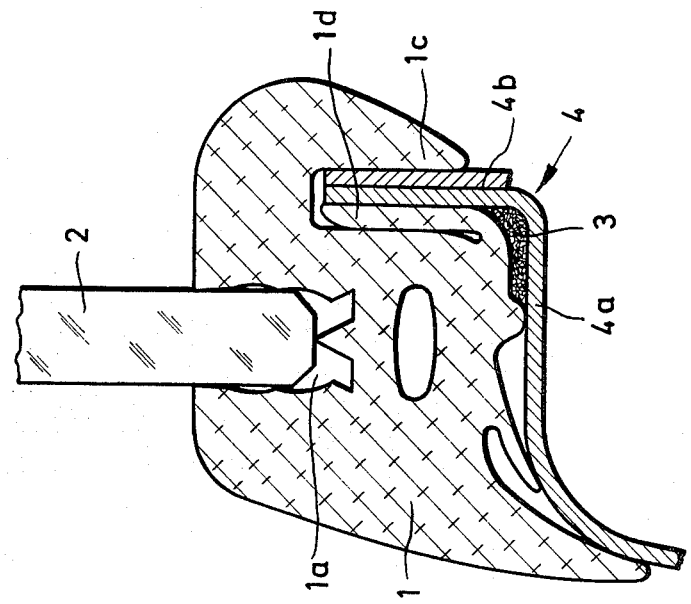
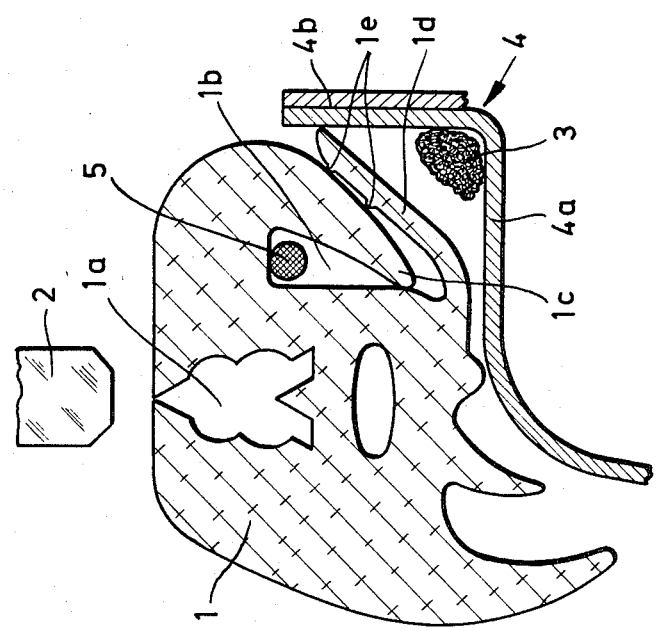

PACKING AND SECURING STRIP FOR WINDSHIELDS

The invention relates to a sealing and fastening strip made of rubber or rubberlike material for the incorporation of a glass plate, especially an automobile windshield, in a metallic frame that surrounds a window opening, with the use of an adhesive.

In present day automobile construction, window plates are often fastened to the window frame with a rubber sealing strip. The rubber sealing strip is provided with grooves for this purpose, wherein the window plate on the one hand and the window frame on the other are elastically clamped. To enhance the clamping and sealing effect, it is known that a filler strip may be laid in an additional groove.

It is further known (German Pat. Nos. 1,195,618, DAS 1,271,571, DAS 1,279,492) that window plates can be bonded to the window frame with or without the introduction of a shaped sealing element. In view of the increasingly stringent standards for vehicles that are being set by the authorities with regard to passenger safety in traffic accidents, the incorporation of vehicle window plates, especially windshields, with the use of an adhesive, becomes increasingly important because official regulations can then be met in the simplest way.

The rules of manufacture that apply to mass production as well as the legitimate demands of the customers for clean workmanship forbid one to bond in window plates, which formerly were elastically clamped in the body opening, without any further means. Many expensive changes in the area of the window frame are required. The fastening of the covering for the roof canopy and window posts becomes more complicated. Besides, trim strips on the outside may be substantially more expensive.

The invention is therefore related to the problem of changing a previously used sealing and fastening strip in such a way that the plate can be bonded into the window frame with the sealing strip without involving, on the one hand, disadvantages in production such as added labor, or quality reduction, or, on the other hand, changes in the car body.

According to the invention this is achieved by means of a covering lip that prevents contact of the adhesive with the retaining lip. It is advantageous to supply ribs on the covering lip, in a known way, whereby in the production of the sealing element a bonding of the covering lip to the retaining lip is prevented.

An example of embodiment of the invention is shown in the drawing and described below in more detail.

FIG. 1 shows the shaped sealing element in unincorporated state, as well as a partial section through the glass plate and window frame, the adhesive applied to the window sill, and the cord that is required for assembly; and FIG. 2 shows a section through the incorporated seal.

Numeral 1 designates the shaped sealing element; the window plate is 2, the adhesive 3, and the window frame 4. In assembly, first window plate 2 is set into the groove 1a. As means for further assembly, a cord 5 is drawn into channel 1b. After the required adhesive 3 has been applied to window sill 4a, the window plate 2 with seal 1 around it is pressed into the window opening of the car body against flange 4b. By means of cord 5, retaining lip 1c is now drawn, in a known way, over flange 4b. At the same time, window plate 2 together with seal 1 is pressed still more against flange 4b so that covering lip 1d is closely applied to the left wall of channel 1b, and almost completely fills said channel 1b. Upon pressure of seal 1 against flange 4b, adhesive 3 is distributed thoroughly between seal 1, especially covering lip 1d, and window frame 4 (FIG. 2). Retaining lip 1c which is now to the right of flange 4b and which, in general, is visible from the interior of the vehicle, is free in this way of adhesive material which otherwise would impair the appearance at this point, and would therefore have to be removed by additional labor.

Ribs 1e on the covering lip 1d prevent a bonding of covering lip 1d with retaining lip 1c in the course of production of shaped rubber element 1.

I claim:
1. Packing and securing strip of rubber or rubberlike material to secure and mount a glass plate, particularly a windshield of a power vehicle in a window opening surrounding metal frame with an adhesive material on said frame comprising a main holding portion, a covering lip on the holding portion, and a channel formed between the main holding portion and the covering lip, and having a retaining lip extending into said channel, thus preventing contact of the adhesive with said retaining lip, said retaining lip being adapted to be pulled from said channel and over said metal frame.

2. A packing and securing strip according to claim 1, in which the covering lip is provided with ribs to contact the strip.

3. Packing and securing strip according to claim 1 in which the covering lip is integral with the main holding portion.

* * * * *